(12) United States Patent
Soldner

(10) Patent No.: US 11,376,805 B2
(45) Date of Patent: Jul. 5, 2022

(54) METHOD FOR THE PRODUCTION OF FIBER COMPOSITE COMPONENT

(71) Applicant: Bayerische Motoren Werke Aktiengesellschaft, Munich (DE)

(72) Inventor: Florian Soldner, Brannenburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 30 days.

(21) Appl. No.: 16/760,542

(22) PCT Filed: Oct. 30, 2018

(86) PCT No.: PCT/EP2018/079694
§ 371 (c)(1),
(2) Date: Apr. 30, 2020

(87) PCT Pub. No.: WO2019/120718
PCT Pub. Date: Jun. 27, 2019

(65) Prior Publication Data
US 2021/0221078 A1 Jul. 22, 2021

(30) Foreign Application Priority Data
Dec. 18, 2017 (DE) .................... 10 2017 222 983.7

(51) Int. Cl.
*B29C 70/88* (2006.01)
*B29C 70/68* (2006.01)
*B29L 31/30* (2006.01)

(52) U.S. Cl.
CPC .......... *B29C 70/887* (2013.01); *B29C 70/682* (2013.01); *B29L 2031/3055* (2013.01)

(58) Field of Classification Search
CPC ........ B29C 70/882; B29C 70/88; H05K 9/00; B29L 2031/3456
See application file for complete search history.

(56) References Cited

U.S. PATENT DOCUMENTS 4,296,855 A * 10/1981 Blalock .................. B29C 70/22
139/419
4,554,204 A * 11/1985 Ono ....................... B29C 70/882
442/281

(Continued)

FOREIGN PATENT DOCUMENTS

CN 107433723 A 12/2017
DE 38 43 535 A1 6/1990

(Continued)

OTHER PUBLICATIONS

International Search Report (PCT/ISA/210) issued in PCT Application No. PCT/EP2018/079694 dated Feb. 13, 2019 with English translation (four (4) pages).

(Continued)

*Primary Examiner* — Matthew J Daniels
*Assistant Examiner* — Andrew D Graham
(74) *Attorney, Agent, or Firm* — Crowell & Moring LLP

(57) ABSTRACT

A method produces a fiber composite component according to which a fiber arrangement having carbon fibers as reinforcing fibers is arranged on a carrier material having a fibrous material in order to form a structure. A covering layer having a non-conductive material is arranged on the structure. The carbon fibers are arranged largely in the load path direction of the fiber composite component to be produced, and regions of the fiber composite component to be penetrated by electromagnetic signals and/or waves are configured such that they are largely free of carbon fibers.

4 Claims, 2 Drawing Sheets

(56) References Cited

U.S. PATENT DOCUMENTS

| | | | | |
|---|---|---|---|---|
| 4,587,160 A * | 5/1986 | Williams | B29C 37/0032 | 264/267 |
| 4,608,453 A * | 8/1986 | Freeman | H05K 9/0001 | 174/363 |
| 4,647,329 A * | 3/1987 | Oono | B29C 70/086 | 156/245 |
| 4,678,699 A * | 7/1987 | Kritchevsky | B29C 51/145 | 174/393 |
| 4,784,899 A * | 11/1988 | Ono | B29C 43/56 | 442/281 |
| 4,789,868 A * | 12/1988 | Oono | B29C 70/086 | 343/907 |
| 5,093,054 A * | 3/1992 | Hirota | B29C 45/0013 | 264/129 |
| 5,202,536 A * | 4/1993 | Buonanno | H05K 9/0015 | 174/356 |
| 5,250,342 A * | 10/1993 | Lang | H05K 9/009 | 174/357 |
| 5,276,277 A * | 1/1994 | Hightower | H05K 9/0003 | 174/376 |
| 5,503,887 A * | 4/1996 | Diaz | B29C 70/882 | 156/152 |
| 5,524,908 A * | 6/1996 | Reis | H05K 9/0015 | 277/654 |
| 5,526,086 A * | 6/1996 | Rizzo | G03D 13/125 | 396/598 |
| 5,611,964 A * | 3/1997 | Friend | D01F 9/1273 | 252/511 |
| 5,853,882 A * | 12/1998 | Cenedella | C08J 5/06 | 428/379 |
| 6,198,445 B1 * | 3/2001 | Alt | H01Q 1/28 | 343/705 |
| 6,248,262 B1 * | 6/2001 | Kubotera | B29C 70/882 | 106/472 |
| 6,262,364 B1 * | 7/2001 | Yoshikawa | H01J 11/10 | 174/389 |
| 6,592,986 B1 * | 7/2003 | Hakotani | B29C 70/025 | 428/295.1 |
| 7,919,037 B1 * | 4/2011 | Boyce | B29C 35/0272 | 264/404 |
| 8,025,752 B2 * | 9/2011 | Fossey, Jr. | B29C 70/882 | 156/155 |
| 8,405,561 B2 * | 3/2013 | Handy | H01Q 21/065 | 343/705 |
| 10,020,561 B2 * | 7/2018 | Kalistaja | H01Q 5/385 | |
| 2002/0038801 A1 * | 4/2002 | Laken | B29C 66/91221 | 219/544 |
| 2003/0155143 A1 * | 8/2003 | Fujieda | B82Y 30/00 | 174/354 |
| 2003/0227107 A1 | 12/2003 | Stewart | | |
| 2004/0009728 A1 * | 1/2004 | Kubomura | B29C 70/882 | 442/205 |
| 2004/0155029 A1 * | 8/2004 | Haag | B32B 27/365 | 219/543 |
| 2004/0188890 A1 * | 9/2004 | Sheridan | B29C 70/025 | 264/510 |
| 2004/0212221 A1 * | 10/2004 | Sato | B29C 70/885 | 296/190.08 |
| 2004/0239578 A1 * | 12/2004 | Aisenbrey | H01Q 1/243 | 343/872 |
| 2005/0205279 A1 * | 9/2005 | Cochrane | H05K 9/002 | 174/355 |
| 2006/0110599 A1 * | 5/2006 | Honma | B29C 66/73752 | 428/413 |
| 2007/0089285 A1 * | 4/2007 | Utecht | B29C 70/34 | 29/600 |
| 2007/0257152 A1 * | 11/2007 | Bergerson | B32B 25/02 | 244/133 |
| 2008/0047747 A1 * | 2/2008 | Aoyama | H05K 9/0096 | 174/389 |
| 2009/0001217 A1 * | 1/2009 | Dufresne | B64D 45/02 | 244/119 |
| 2009/0067149 A1 * | 3/2009 | Bogursky | H05K 9/003 | 361/816 |
| 2009/0075088 A1 * | 3/2009 | Vaidyanathan | B29C 70/48 | 428/413 |
| 2009/0126984 A1 * | 5/2009 | Saneto | H05K 9/0096 | 174/350 |
| 2009/0133922 A1 * | 5/2009 | Okazaki | H05K 9/0096 | 174/389 |
| 2009/0195359 A1 * | 8/2009 | Koyama | G06K 19/0723 | 340/10.1 |
| 2009/0208721 A1 * | 8/2009 | Tsuchiya | B29C 66/1122 | 428/220 |
| 2010/0021695 A1 * | 1/2010 | Naoyuki | B41N 1/06 | 428/173 |
| 2010/0096063 A1 * | 4/2010 | Friddell | B29C 70/081 | 156/64 |
| 2010/0288433 A1 * | 11/2010 | Montesano Benito | B29C 70/88 | 156/250 |
| 2011/0024562 A1 * | 2/2011 | Kastner | B29C 70/887 | 244/119 |
| 2011/0036654 A1 * | 2/2011 | Rinderlin | B29C 70/887 | 180/68.5 |
| 2011/0090656 A1 * | 4/2011 | Hamatani | H05K 3/4007 | 361/761 |
| 2011/0274897 A1 | 11/2011 | Dauner et al. | | |
| 2012/0028047 A1 * | 2/2012 | Imai | B29C 48/625 | 428/403 |
| 2012/0050015 A1 * | 3/2012 | Low | H02J 7/00034 | 340/10.1 |
| 2012/0285738 A1 * | 11/2012 | Cochrane | H05K 9/0041 | 174/382 |
| 2013/0242487 A1 * | 9/2013 | Fujioka | B29C 45/14811 | 361/679.01 |
| 2014/0098501 A1 * | 4/2014 | Kawaguchi | H05K 9/0086 | 361/750 |
| 2015/0174843 A1 * | 6/2015 | Crepin | B64C 9/22 | 264/258 |
| 2015/0183305 A1 * | 7/2015 | Soldner | B29C 70/887 | 296/146.5 |
| 2015/0344138 A1 * | 12/2015 | Wen | H05B 3/286 | 219/541 |
| 2016/0257394 A1 * | 9/2016 | Gleason | B29C 70/882 | |
| 2016/0297183 A1 * | 10/2016 | Demange | B32B 15/14 | |
| 2017/0142872 A1 * | 5/2017 | Ricci | H02J 50/12 | |

FOREIGN PATENT DOCUMENTS

| | | |
|---|---|---|
| DE | 10 2008 027 149 A1 | 12/2009 |
| DE | 10 2009 006 130 A1 | 7/2010 |
| DE | 10 2009 006 130 B4 | 9/2011 |
| DE | 10 2012 001 584 A1 | 8/2013 |
| DE | 10 2014 010 741 A1 | 1/2015 |
| FR | 3 051 711 A1 | 12/2017 |
| WO | WO 2010/071214 A1 | 6/2010 |

OTHER PUBLICATIONS

German-language Written Opinion (PCT/ISA/237) issued in PCT Application No. PCT/EP2018/079694 dated Feb. 13, 2019 (five (5) pages).

German-language Search Report issued in German Application No. 102017222983.7 dated Mar. 19, 2018 with partial English translation (13 pages).

Chinese Office Action issued in Chinese application No. 201880074695.4 dated Jun. 3, 2021, with English translation (Thirteen (13) pages).

* cited by examiner

METHOD FOR THE PRODUCTION OF FIBER COMPOSITE COMPONENT

BACKGROUND AND SUMMARY OF THE INVENTION

The present invention relates to a method for the production of a fiber composite component, in which a fiber arrangement with carbon fibers as reinforcing fibers is arranged on a carrier material having fiber material for forming a structure, and a cover layer having a non-conducting material is arranged on the structure.

In the automobile industry, fiber-reinforced carbon components, which may be for example body components, for example in the form of tailgates, doors or fenders, have been used for some time. These components are frequently made from SMC fiber semi-finished products, which may be for example pre-impregnated glass fiber matting that is formed using a press tool to form the fiber composite component.

It has also become known to integrate into the layer structure, which is made for example from glass-fiber carrier material, carbon fibers that can serve in the layer structure as reinforcing fibers and can additionally also be provided near the surface for improving the visual overall impression of the fiber composite component to give the fiber composite component a refined visual appearance.

To achieve this visual appearance, a cover layer made of carbon-fiber-reinforced plastic can be fastened to the fiber composite component.

As an example in this respect, DE 10 2009 006 130 B4 can be mentioned, which mentions a composite component made from at least three different material layers, in which the outer cover layer has a carbon-fiber-reinforced plastic, which fulfills a load-bearing function only as a minor role, but primarily serves to improve the visual appearance of the component.

Independently of the intended use of the carbon fibers introduced into such a fiber composite component, the integration of the carbon fibers has the disadvantage that, due to their physical properties, they obstruct the reception or the transmission of electromagnetic signals and/or waves.

However, such electromagnetic signals and/or waves are increasingly required in vehicles for example for communication between vehicles, for example in the area of the transmission of data or signals to improve navigation or signaling of dangerous situations, such as a slippery road. Another case where it is used is, for example, the integration of antennas in the vehicle as a transmitter and/or receiver of radar signals to regulate distances between vehicles. The transmission of such signals or data is obstructed in the transmission path by fiber composite components having a high carbon content.

Proceeding from this, the present invention is based on the object of providing a method for the production of a fiber composite component that is intended to have carbon fibers as reinforcing fibers, but at the same time should not significantly obstruct the transmission of data and/or signals.

The invention provides a method for producing a fiber composite component in which a fiber arrangement with carbon fibers as reinforcing fibers is arranged on a carrier material having fiber material to form a structure, and a cover layer having a non-conducting material is arranged on the structure. According to the method, the carbon fibers are arranged largely in the load path direction of the fiber composite component to be manufactured, and regions of the fiber composite component that are provided to be penetrated with electromagnetic signals and/or waves are designed to be largely free from carbon fibers.

The method according to the invention thus solves the problem of combining the necessity of reinforcing fiber composite components using carbon fibers with the requirement of the transmission of electromagnetic signals and/or waves through such fiber composite components that is as undisturbed as possible. The reinforcement of the fiber composite components with the carbon fibers ensures that the fiber composite component can be designed to be more lightweight than a fiber composite component that is made, in comparison, only from a carrier material having fiber material.

If, for example, only glass fibers are used for forming such a fiber composite component, the structure must have a greater layer thickness than is necessary in the case of the integration of carbon fibers into the structure, since a structure having only glass fiber material has comparatively less stiffness and stability.

The integration of the carbon fibers in the load path direction of the manufactured fiber composite component thus makes it possible to design the fiber composite component to be more lightweight overall, which supports the goal for a lightweight construction.

The arrangement of the carbon fibers such that regions of the fiber composite component that are provided to be penetrated by electromagnetic signals and/or waves are designed to be largely free from carbon fibers also ensures that the largely undisturbed signal transmission, that is to say the largely undisturbed emission and/or reception of electromagnetic signals and/or waves through the regions which are designed to be largely free from carbon fibers, is achieved.

In this way, it is possible to arrange devices for emitting and/or receiving electromagnetic waves and/or signals, which may be for example sensors and/or antennas, in the region of the regions of the fiber composite component that remain largely free from carbon fibers.

Provision is made according to a development of the invention for the carbon fibers to be arranged in the form of fiber bundles and/or fiber bundle matting or fiber matting at a clear distance from the regions.

In the case of a two-dimensional or extensive formation of the fiber composite component or of the region of the fiber composite component that is to be penetrated by electromagnetic signals and/or waves, the carbon fibers are thus arranged at a lateral distance from the region.

In a three-dimensional or spatial formation of the fiber composite component or of the region of the fiber composite component that is to be penetrated by electromagnetic signals and/or waves, the carbon fibers are arranged at a lateral and/or spatial distance from the region. In other words, this means that the carbon fibers can also spatially enclose the region but do not extend through the region.

According to a development of the method according to the invention, provision is also made for the carbon fibers to be arranged on the carrier material in the form of a surround enclosing the region. This is meant to express that the carbon fibers can surround the region for example as a closed or open curved line, that is to say the carbon fibers are arranged in the load path direction around the transmission and/or reception region, but are arranged at a distance from the emission region or reception region, which is embodied for example in the form of a cone, of the sensors and/or antennas that are arranged in the region. In this way, largely undisturbed transmission of the electromagnetic waves and/or signals by way of the sensors and/or antennas or of the sensors and/or antennas is achieved.

According to one development, the invention is also characterized in that means for retaining devices receiving and/or transmitting electromagnetic signals and/or waves in the form of for example sensors and/or antennas are integrated on/into the structure. In this way, for example receptacles or retainers for sensors and/or antennas can be integrated into the structure of the fiber composite component during the production of the fiber composite component such that the later arrangement of such receptacles or retainers on the finished fiber composite component is dispensed with. For this purpose, means in the form of for example retainers or latching means or bonding areas therefor can be arranged on the carrier material and/or the reinforcing fibers during the production of the fiber composite component such that these means, after finishing the fiber composite component, are integral parts of the fiber composite component and are designed for receiving the sensors and/or antennas.

Similarly, the method according to the invention is characterized by a development to the effect that load introduction elements are integrated into the structure and in this way are integral parts of the manufactured fiber composite component. The load introduction elements can be used for example to fix the finished fiber composite component to the body structure of a vehicle.

Finally, provision is also made in accordance with a development of the invention for SMC fiber semi-finished products to be used as the carrier material for forming the fiber composite component and for the implementation of a cost-effective production method to be made possible in this way.

The invention will be explained in more detail below with reference to the drawings.

DETAILED DESCRIPTION OF THE DRAWINGS

Figure 1:
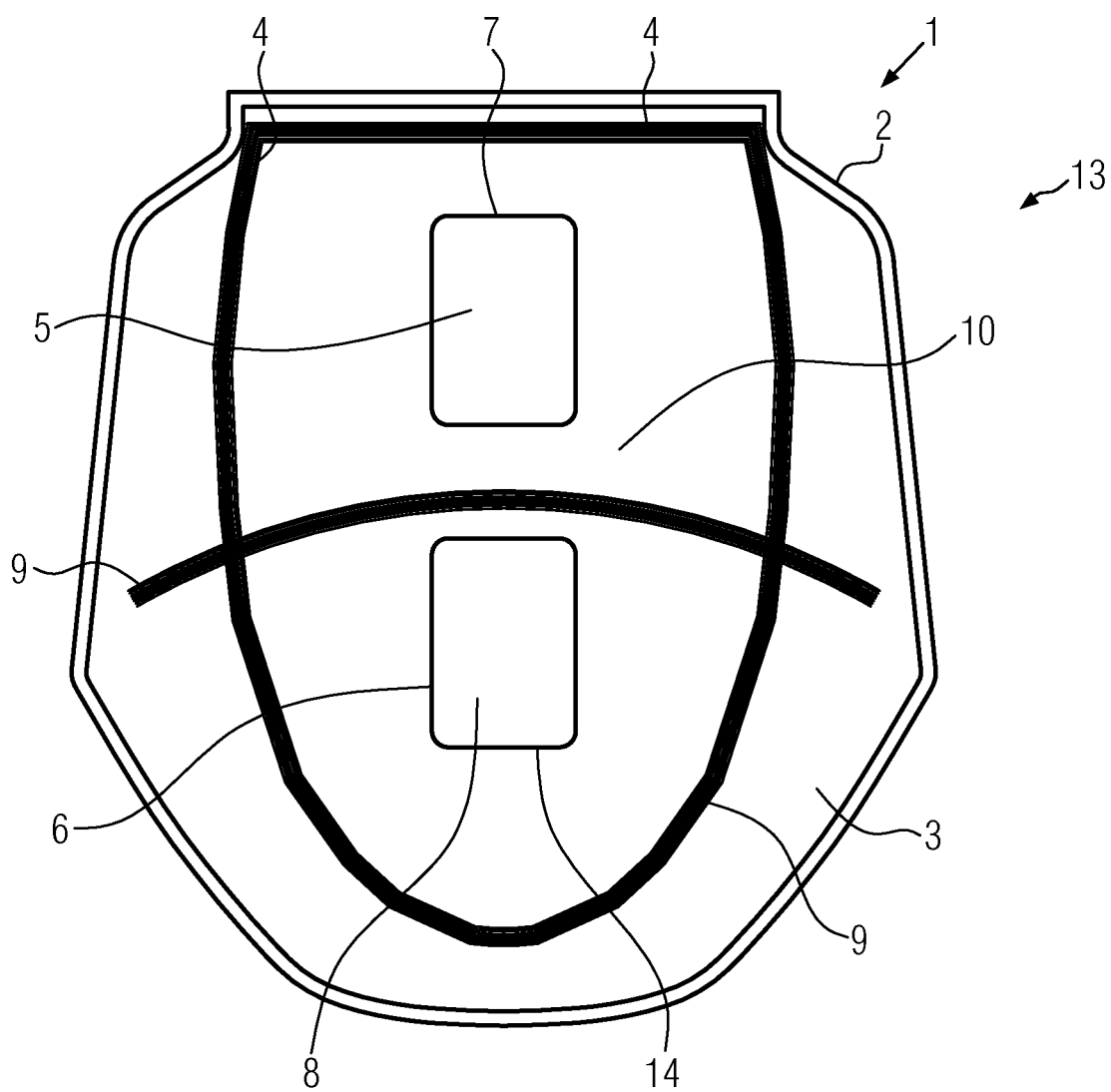
FIG. 1 is a plan view of a fiber composite component in the form of a body component having two signal transmission devices arranged thereon in the form of a sensor and an antenna.

FIG. 1 of the drawing shows a fiber composite component 1 in the form of a body component 2 for a vehicle, the latter not being illustrated further. The body component 2 is part of a tailgate of the vehicle.

To produce the body component 2, a near-net-shape carrier material 3 with glass fiber material is provided, on which schematically illustrated reinforcing fibers made from carbon fiber bundles 4 arranged in the load path direction of the fiber composite component 1 to be manufactured are arranged. The carrier material 3 can be dry fiber material or fiber material already soaked with resin.

As is easily apparent from FIG. 1, the reinforcing fibers 4 are not applied as a material that covers the carrier material 3 extensively or completely, but are applied in a targeted fashion only in places that are located in the load path direction of the manufactured fiber composite component 1 and, in addition, leave regions 5, 6, which are provided for the arrangement of an antenna 7 and a sensor 8, free.

The antenna 7 can be for example an antenna that serves for the measurement of the distance of a following vehicle by way of radar waves, and the sensor 8 serves for capturing the surface condition of the road.

The antenna 7 can thus be used to emit and receive electromagnetic waves, and the sensor 8 captures the road condition based on electromagnetic signals, wherein both the antenna 7 and the sensor 8 are intended to represent merely examples of transmission and reception devices.

As is apparent from FIG. 1, both transmission and reception devices 7, 8 are enclosed by the reinforcing fibers 4 in the form of carbon fibers 9, but the carbon fibers 9 extend in each case at a distance from the regions of the arrangement of the antenna 7 and of the sensor 8, which means that a shielding effect of the antenna 7 and of the sensor 8, as would occur if the carbon fibers 9 were to completely cover the regions 5 and 6, is not present here.

As is moreover likewise apparent from FIG. 1, a carbon fiber bundle 9 also extends between the regions 5 and 6, but in a portion 10 between the regions 5 and 6, such that likewise no shielding effect that could significantly impair the signal transmission occurs owing to this arrangement of the carbon fiber bundle 9 in the portion 10.

In the structure 13 which is formed in this way, it is also possible for structures 14 for the arrangement or retaining of the antenna 7 and the sensor 8 to be integrated, which structures are illustrated merely schematically in FIG. 1 of the drawing. In the same way, load introduction elements, which are not illustrated further, can be integrated into the structure 13 during the production process of the fiber composite component 1 produced according to the invention.

Figure 2:
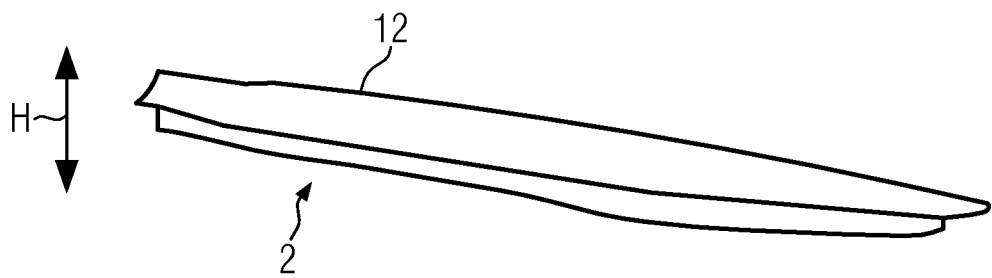
FIG. 2 is a side view of the fiber composite component according to FIG. 1.

FIG. 2 of the drawing shows a side view of the body component 2 illustrated in FIG. 1.

As is easily apparent from FIG. 2, the body component 2 has a height extent in the direction of the double-headed arrow H, that is to say it has a spatial structure. The regions 5, 6, in which the antenna 7 and the sensor 8 are arranged, are not covered by the carbon fiber bundles 9 in the direction of the transmission of the electromagnetic waves and/or signals, with the result that the signal transmission is not negatively impaired by the carbon fibers.

For this purpose, the carbon fiber bundles 9 are arranged at a clear distance from the regions 5 and 6, specifically in the direction of the height extent H of the body component 2.

Figure 3:
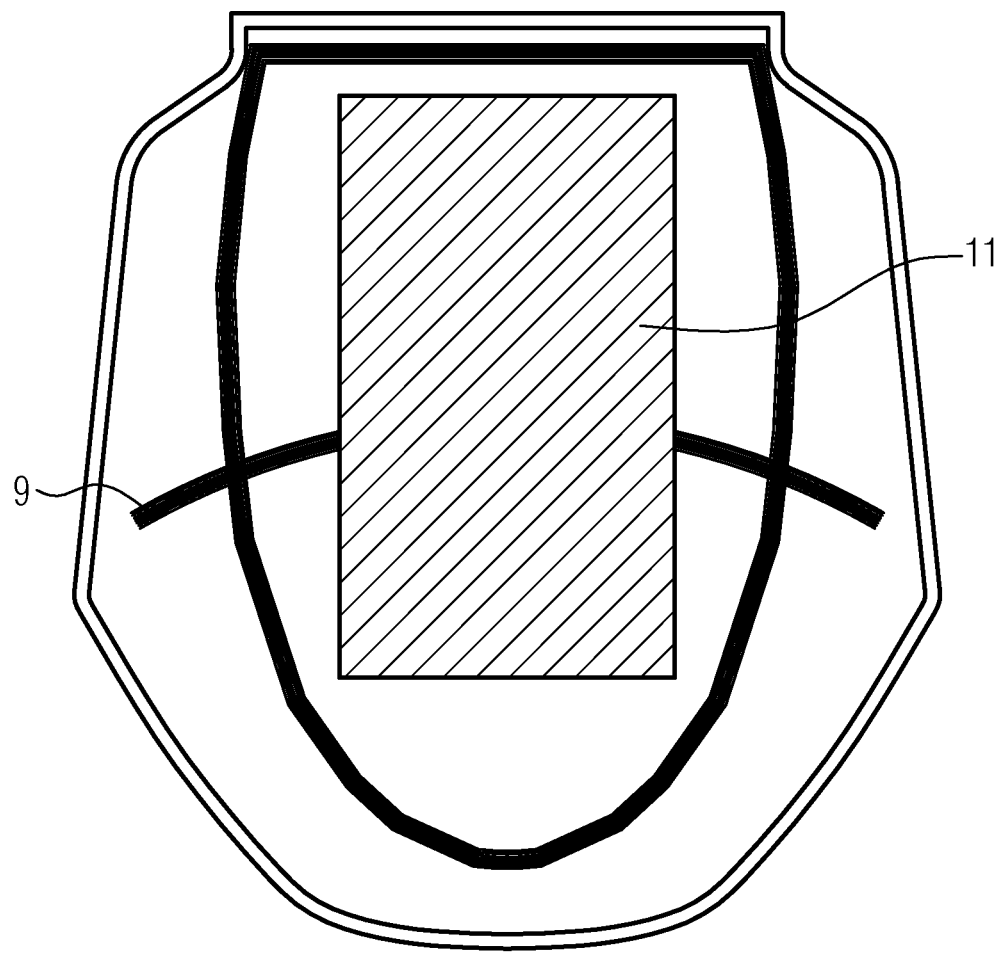
FIG. 3 is an illustration similar to that of FIG. 1, which schematically shows the region of the fiber composite component that is designed to be penetrated by electromagnetic waves.

FIG. 3 of the drawing, finally, shows a schematic illustration of the region of the fiber composite component 2 which is formed to be penetrated by electromagnetic waves and/or signals. This region is formed in FIG. 3 schematically as a hatched rectangle 11 and represents an area that is made up of the regions 5 and 6.

As is easily apparent from FIG. 3, the carbon fiber bundle 9 extends in a direction into the drawing plane behind the rectangle 11, which is intended to express that such an arrangement of the carbon fiber bundle 9 is non-detrimental, since the main emission direction and main reception direction of the antenna 7 and of the sensor 8 extend in the direction out of the drawing plane of FIG. 3, and the arrangement of the carbon fiber bundle 9 in the drawing plane behind or under the rectangle 11 is thus non-detrimental.

Finally, it is also possible for a cover layer 12 (see FIG. 2) made from a non-conducting material to be fastened to the upper side of the fiber composite component 1, which cover layer 12 may be for example a thin layer made from glass fiber matting which can be provided with an application of paint in the further production process of a vehicle that is provided with the fiber composite component 1 produced according to the invention. By forming the cover layer 12 from a non-conducting material, a shielding effect is avoided.

The method according to the invention for producing a fiber composite component is characterized by a high light-weight design grade, and a stiffness and stability of the fiber composite component to be produced that is excellent for the corresponding use is achieved owing to the arrangement of the carbon fibers as reinforcing fibers, even though the content of carrier material having fiber material can be decreased and thus the net mass of the fiber composite component can be reduced.

Owing to the application of the carbon fibers only largely in the load path direction of the fiber composite component to be produced, a reduction in production costs is achieved and, owing to the arrangement of the carbon fibers according to the invention largely outside the regions that are provided to be penetrated by electromagnetic signals and/or waves, a viewing window for the antennas and/or sensors integrated there is provided, which ensures that the signal transmission is not negatively influenced despite the integration of the carbon fibers. In addition, the method according to the invention has the advantage that it comprises the integration of retaining devices for the antennas and/or sensors to be fastened, with the result that a complicated retroactive arrangement of such retaining devices after the production of the fiber composite component is dispensed with.

With respect to features of the invention which were not explained above in more detail, reference is expressly made to the claims and the drawing.

LIST OF REFERENCE SIGNS

1. Fiber composite component
2. Body component
3. Carrier material
4. Reinforcing fibers
5. Region
6. Region
7. Antenna
8. Sensor
9. Carbon fiber bundle
10. Antenna
11. Rectangle
12. Cover layer
13. Structure
14. Retaining structure

What is claimed is:

1. A method for producing a fiber composite component, comprising:
    arranging a fiber arrangement comprising carbon fibers as reinforcing fibers, on a carrier material, the carrier material comprising fiber material, for forming a structure;
    arranging a cover layer having a non-conducting material on the structure, wherein
    any regions of the fiber composite component which are provided for arranging an antenna or a sensor, wherein the regions are designated as to be penetrated through with electromagnetic signals and/or waves and wherein the regions are in a form of a cone in the fiber composite component, are configured to be free from the carbon fibers such that the carbon fibers are arranged in a form of fiber bundles, fiber bundle matting, or fiber matting at a clear lateral distance from the regions and at a clear distance in a direction of a height extent of the fiber composite component from the regions.

2. The method according to claim 1, wherein
the carbon fibers are arranged on the carrier material in a form of a surround that encloses the regions.

3. The method according to claim 1, further comprising:
integrating, on or into the structure, retention devices that are able to retain the antenna or the sensor.

4. The method according to claim 1, wherein
SMC fiber semi-finished products are used as the carrier material for forming the fiber composite component.

* * * * *